3,354,168
PHENYL PYRIDYL CARBINOL ETHERS
Wijbe Thomas Nauta, Amsterdam, Netherlands, assignor to N.V. Koninklijke Pharmaceutische Fabrieken v/h Brocades-Stheeman & Pharmacia, Amsterdam, Netherlands
No Drawing. Original application Nov. 7, 1961, Ser. No. 150,658. Divided and this application Oct. 30, 1963, Ser. No. 319,951
Claims priority, application Netherlands, Nov. 11, 1960, 257,859
7 Claims. (Cl. 260—296)

ABSTRACT OF THE DISCLOSURE

This invention relates to new phenyl pyridyl carbinol ethers wherein the phenyl moiety possesses at least three carbon substituents attached thereto. The compounds of this invention possess activities, such as, analgesic and diuretic agents.

This application is a divison of my application, Ser. No. 150,658, filed Nov. 7, 1961, now abandoned.

This invention relates to new ethers and more particularly to new ethers of substituted phenyl pyridyl carbinols and 2-dimethylaminoethanols, their method of preparation, pharmaceutical compositions containing the same and the method of using such compositions.

Prior to this invention various ethers of phenyl pyridyl carbinols and 2-dialkylaminoethanols were known, as evidenced by U.S. Patents 2,534,238, 2,606,190, 2,606,193, 2,606,195 and 2,622,891 and British Patent 651,710. Structurally, these ethers contained either an unsubstituted phenyl-(2-pyridyl)carbinol moiety or an alkyl substituted phenyl-(2-pyridyl)carbinol moiety, wherein the total carbons in the alkyl substituents was less than four. Physiologically, the ethers of the prior art were antispasmodic, antihistaminic and/or antiallergic agents.

It has been surprisingly found that compounds of the following general formula:

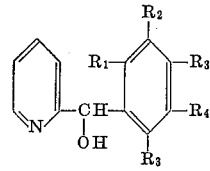

O—CH$_2$CH$_2$—N(CH$_3$)$_2$ wherein R$_1$ is a lower alkyl radical of less than seven carbon atoms; R$_2$, R$_3$ and R$_4$ are each hydrogen or lower alkyl of less than five carbon atoms, and R$_5$ is lower alkyl of less than five carbon atoms, provided that the total number of carbon atoms of R$_1$, R$_2$, R$_3$, R$_4$ and R$_5$ is at least three, unlike those compounds previously known in the art, possess no appreciable antispasmodic, antihistaminic activity, but do possess activities as analgetic and particularly diuretic agents. Obviously, this discovery could not have been predicted from the teachings in the prior art, but to the contrary are clearly contraindicated thereby.

One aspect of this invention, therefore, is the provision of the new compounds of this invention which include those of the general formula given above and acid-addition salts thereof. The preferred acid-addition salts are those formed with non-toxic acids, such as the hydrohalic acids (e.g., hydrochloric acid and hydrobromic acid), sulfuric acid, oxalic acid, citric acid and maleic acid.

The compounds of this invention are prepared by the process of this invention which comprises reacting a carbinol of the general formula

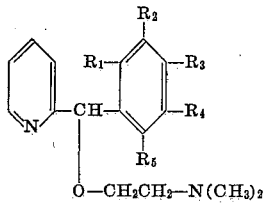

wherein R$_1$, R$_2$, R$_3$, R$_4$ and R$_5$ are as hereinbefore defined, with a 2-dimethylaminoethyl halide (preferably chloride). The reaction is preferably conducted in the presence of a basic catalyst, such as sodium amide.

The carbinols are new compounds of this invention which can be prepared by a number of processes, such as by reducing the desired substituted benzaldehyde with 2-pyridylmagnesium bromide by the method of Overhoff and Proost [Rec. trav. chim. 57, 179–189 (1938)], or by reacting pyridine with the desired substituted benzaldehyde in the presence of a catalyst by the method of Emmert and Assendorf [Ber. 72B, 1188 (1939)]. Preferably, however, the new carbinol intermediates are prepared by reacting the desired substituted phenyl bromide of the general formula

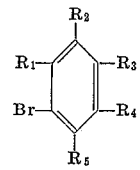

wherein R$_1$, R$_2$, R$_3$, R$_4$ and R$_5$ are as hereinbefore defined with magnesium in ether to yield the corresponding Grignard reagent and then reacting the Grignard thus formed with 2-pyridine aldehyde.

Suitable phenyl bromide reactants include 2,4,6-trimethylphenyl bromide, 2,3,5,6-tetramethylphenyl bromide, 2,6-diethylphenyl bromide and 2,6-diisopropylphenyl bromide. In addition any other phenyl bromide may be used provided that it has alkyl substituents in the 2 and 6 position and a total alkyl substitution of at least three carbon atoms.

As stated previously, the compounds of this invention, unlike the phenyl-pyridyl carbinol ethers previously known, are pharmaceutically utilizable products which possess both analgetic and diuretic activities. For these purposes they are administered perorally in pharmaceutically-acceptable compositions, such as liquid preparations (e.g., syrups and elixirs), and solid preparations, such as solid dosage unit forms (e.g., tablets and capsules). To prepare the compositions of this invention, the medicaments of this invention are formulated in the usual manner employing commonly used fillers, excipients, solvents, etc. For example, two-piece hard gelatin capsules may be filled with a mixture of the desired ether and excipient (e.g., starch, talc, stearic acid and magnesium stearate). Also, one-piece gelatin capsules may be prepared using sufficient corn oil to render the compound capsulatable. Tablets may be prepared by using starch, lactose or other conventional excipients, and may be scored to enable one to take fractional dosages, if desired. Any of the tableting materials used in pharmaceutical practice may be employed where there is no incompatibility with the ether. The ether may also be formulated in liquid form. Thus, a composition may be preparad to contain 2 mg. or more of the ether per ml. of liquid pharmaceutical carrier, such as a carbohydrate-containing (e.g., syrup), aqueous, or aqueous-alcoholic (e.g., elixir) vehicle, these liquid compositions then be administered in 5 ml. or more doses.

Preferably the compounds of this invention, when used as diuretics, are administered in a daily dosage of about 50 mg. to about 150 mg. (optimally about 75 mg. to about 100 mg.). If administered in solid dosage unit form, they are so compounded that each dosage unit (e.g., tablet and capsule) contains about 25 mg. to about 100 mg. (optimally about 25 mg. to about 50 mg.) of the medicament.

Such pharmaceutical compositions can be administered to patients suffering from edema or other conditions which indicate a diuretic.

The following examples illustrate the invention (all temperatures being in centigrade). The first five examples are directed to the preparation of the intermediates used in preparing the final products of this invention; the following five examples are directed to the preparation of said final products; and the last two examples are directed to the preparation of the compositions of this invention:

EXAMPLE 1

*(2,6-diethylphenyl)-(2-pyridyl)carbinol*

0.55 mol of magnesium turnings is placed in a 2-liter three-necked flask, provided with a dropping-funnel, a reflux condenser and a stirrer. To this is added 0.05 mol of 2,6-diethylphenyl bromide in 30 ml. of anhydrous ether. After the reaction has been started by gentle heating of the flask, an additional 0.45 mole of 2,6-diethylphenyl bromide in 150 ml. of anhydrous ether is added dropwise, with stirring, at such a rate that the ether continues to reflux. If the reaction proceeds too violently, cooling is applied. At the end of the reaction the mixture is cooled to 0°. At this temperature, 0.5 mol of 2-pyridine aldehyde in 200 ml. of anhydrous ether is added in one hour under vigorous stirring. At the end of the reaction, the mixture is heated under reflux for another hour, thereupon the reaction mixture is chilled with ice and decomposed with an ice cold solution of 60 g. of ammonium chloride in 200 ml. of water. The ether layer is separated from the water layer and the latter is extracted twice with ether. The ethereal solutions are combined and extracted three times with 50 ml. of 10% hydrochloric acid. The extract is neutralized with sodium bicarbonate and then extracted three times with ether. After washing with water and drying with anhydrous potassium carbonate the ethereal solution is evaporated and the carbinol crystallizes. Purification is accomplished by means of crystallization from a mixture of ether and petroleum ether to yield pure (2,6-diethylphenyl)-(2-pyridyl)carbinol; M.P. 42°; B.P. 140–145° (2 mm. mercury).

*Analysis.*—Calcd. for $C_{16}H_{19}NO$: C, 79.62; H, 7.94; N, 5.81. Found: C, 79.5; H, 7.9; N, 5.9.

EXAMPLE 2

*(2,4,6-trimethylphenyl)-(2-pyridyl)carbinol*

Following the procedure of Example 1, but substituting 0.5 mol of 2,4,6-trimethylphenyl bromide for the 2,6-diethylphenyl bromide, (2,4,6-trimethylphenyl)-(2-pyridyl)carbinol, M.P. 65° is obtained. The hydrochloride salt melts at 188–190°.

EXAMPLE 3

*(2,3,5,6-tetramethylphenyl)-(2-pyridyl)carbinol*

Following the procedure of Example 1, but substituting 0.5 mol of 2,3,5,6-tetramethylphenyl bromide for the 2,6-diethylphenyl bromide, (2,3,5,6-tetramethylphenyl)-(2-pyridyl)carbinol, M.P. 104° is obtained. The hydrochloride salt melts at 187–188°.

EXAMPLE 4

*(2,6-diisopropylphenyl)-(2-pyridyl)carbinol*

Following the procedure of Example 1, but substituting 0.5 mol of 2,6-diisopropylphenyl bromide for the 2,6-diethylphenyl bromide, (2,6-diisopropylphenyl)-(2-pyridyl)carbinol, M.P. 102°, is obtained.

EXAMPLE 5

*2-dimethylaminoethyl (2,6-diethylphenyl)-(2-pyridyl) carbinol ether*

In a three-necked flask, equipped with a stirrer, reflux condenser and dropping-funnel, 0.140 mol of (2,6-diethylphenyl)-(2-pyridyl)carbinol is dissolved in 200 ml. of anhydrous toluene, after which 15 ml. of toluene is distilled off. The solution is then cooled to 0° and 0.146 mol of sodium amide is added. The mixture is then slowly heated to 100° with stirring. A violent generation of ammonia occurs and the solution acquires a deep blue to reddish brown color. The reaction mixture so obtained is heated at 100° for four hours by which time the evolution of ammonia has ceased. Thereafter, another 0.146 mol of sodium amide is added and then, at 0°, 0.141 mol of 2-dimethylaminoethyl chloride hydrochloride is added. Ammonia is again generated. The temperature is raised to 100° with stirring in a period of about one hour and the reaction mixture is kept at this temperature for 14 to 16 hours. It is then cooled to room temperature and through the dropping-funnel is added 100 ml. of water. The toluene layer is separated and washed once with water, dried with anhydrous potassium carbonate and distilled. After the percentage of 2-dimethylaminoethyl (2,6-diethylphenyl)-(2-pyridyl)carbinol ether in the distillate has been determined by titration, it is dissolved in anhydrous ethyl acetate and the calculated amount of alcoholic hydrochloric acid solution required to form the mono hydrochloric acid salt is added. The mono hydrochloric acid salt formed melts at 151°. The free base boils at 172–174° (2 mm. of mercury).

*Analysis.*—Calcd. for $C_{20}H_{28}N_2O$: C, 68.84; H, 8.38; N, 8.03. Found: C, 68.5; H, 8.5; N, 7.9.

EXAMPLE 6

*2-dimethylaminoethyl (2,4,6-trimethylphenyl)-(2-pyridyl)carbinol ether*

Following the procedure of Example 5, but substituting 0.140 mol of (2,4,6-trimethylphenyl)-(2-pyridyl) carbinol for the (2,6-diethylphenyl)-(2-pyridyl)carbinol, the mono hydrochloric acid salt of 2-dimethylaminoethyl (2,4,6-trimethylphenyl)-(2 - pyridyl)carbinol ether, M.P. 173–174°, is obtained. The free base boils at 167–174° (2 mm. mercury).

EXAMPLE 7

*2-dimethylaminoethyl (2,3,5,6-tetramethylphenyl)-(2-pyridyl)carbinol ether*

Following the procedure of Example 5, but substituting 0.140 mol of (2,3,5,6 tetramethylphenyl) - (2 - pyridyl) carbinol for the (2,6-diethylphenyl)-(2-pyridyl)carbinol, the mono hydrocholric acid salt of 2-dimethylaminoethyl (2,3,5,6-tetramethylphenyl) - (2 - pyridyl)carbinol ether, M.P. 197° is obtained. The free base boils at 175–180° (1 mm. mercury).

EXAMPLE 8

*2-dimethylaminoethyl (2,6-diisoprropylphenyl)-(2-pyridyl)carbinol ether*

Following the procedure of Example 5, but substituting 0.140 mol of (2,6-diisopropylphenyl)-(2-pyridyl)carbinol for the (2,6-diethylphenyl)-(2pyridyl)carbinol, the mono hydrochloric acid salt of 2-dimethylaminoethyl (2,6-diisopropylphenyl)-(2-pyridyl)carbinol ether, M.P. 156–157°, is obtained. The free base boils at 160–168° (2 mm. mercury).

EXAMPLE 9

*Tablets*

To prepare 100 tablets, each containing 50 mg. of 2-dimethylaminoethyl (2,6-diethylphenyl)-(2 - pyridyl)carbinol ether monohydrochloride, the following ingredients are used:

| | G. |
|---|---|
| 2-dimethylaminoethyl (2,6-diethylphenyl)-(2-pyridyl)carbinol monohydrochloride | 5.0 |
| Dicalcium phosphate | 3.6 |
| Lactose | 6.0 |
| Corn starch | 1.8 |
| Granulating paste (corn starch in water, 11% in weight) | 0.2 |
| Talc | 0.3 |
| Magnesium stearate | 0.04 |
| Distilled water (about) | 2.3 |

A tablet granulation is prepared from these ingredients by passing the ether through a 100-mesh screen; the dicalcium phosphate, lactose and corn starch are passed through a 60-mesh screen; the screened materials are intermixed; the granulating paste and sufficient water are worked in to give a pasty consistency, and the material passed through a large mesh (e.g., No. 16) screen to produce granules. The granules are tray dried at 130° F. for three hours; and the dry granulation is put through a No. 20 screen and mixed with the previously sieved talc and magnesium stearate. The resulting mixture is then compressed into tablets, each containing about 50 mg. of the ether.

In a similar manner, all other compounds of this invention can be tableted.

EXAMPLE 10

*Capsules*

The following ingredients are for the preparation of 100 dry-fill capsules, each containing 25 mg. of 2-dimethylaminoethyl (2,6-diisopropylphenyl)-(2-pyridyl)carbinol monohydrochloride:

| | G. |
|---|---|
| 2 - dimethylaminoethyl (2,6-diisopropylphenyl)-(2-pyridyl)carbinol monohydrochloride | 2,5 |
| Lactose | 11.7 |
| Magnesium stearate | 0.8 |

These ingredients are uniformly intermixed in the manner known in the art and filled into 100 two-piece hard gelatin capsules to provide capsules each containing 25 mg. of the ether.

In a similar manner, all other compounds of this invention can be encapsulated.

In addition to their analgetic and diuretic activities, it is of primary importance that the compounds of this invention strongly influence the metabolism of brain tissue and especially stimulate the metabolism of amino acids in brain tissue. The respiration is inhibited, as can be concluded from the decrease in the oxygen consumption during metabolism of rat brain tissue under aerobic conditions, whereas the total concentration of $\gamma$-aminobutyric acid (GABA) and glutamic acid respectively increases. As both of these amino acids play an important role in the central nervous system an increase in their level in brain tissue is of utmost importance. This is the more apparent because other pharmaca, which have proven their great usefulness in medicine, exhibit an influence on the metabolism of amino acids which is similar to that of the compounds of this invention.

Examples of such compounds are orphenadrine ($\beta$-dimethylamino-ethyl 2-methyl benzhydryl ether) and chlorpromazine [10-(3'-dimethylaminopropyl)-3-chlorophenothiazine], which according to Nauta c.s. (The Lancet 1958, pages 591–592) cause a seven-fold increase of the glutamic acid level and a more than ten-fold increase in the GABA level of the incubation medium. Although the correlation between influence on the amino acid metabolism and psychotropic action of certain medicines is not yet established beyond doubt, it seems to be perfectly clear that such a correlation exists.

The method of investigation used to examine the influence of the compounds according to the invention on the metabolism of rat brain tissue and particularly on the concentration of GABA and glutamic acid is in general that described and used by Ernsting c.s. [J. of Neurochem. 5, 121–127 (1960)].

In the following table the amounts of the amino acids are indicated which were obtained with the aid of special chromatographic methods. As an incubation fluid the buffer used by Ernsting (loc. cit.) was chosen. D-glucose was used as the substrate at a final concentration of 0.02 mol. The final concentration of the compounds under test invariably was 0.002 mol. values obtained from control experiments are also indicated. (See table below.)

It follows from the table that in adding the compounds according to the invention the medium contains more GABA and glutamic acid than in the experiments wherein compounds with monomethyl and dimethyl substituted phenyl nuclei were used as inhibitors. Not only an increase in the number of alkyl substituents but also an enlargement of the alkyl substituents enhances the results. In the control experiments the levels of GABA and glutamic acid for medium and tissue are about the same as directly after dissection.

This invention may be variously otherwise embodied within the scope of the appended claims.

| Substituent in the phenyl nucleus | GABA level ($\gamma$/100 mg. tissue) | | | | | | Glutamic acid level ($\gamma$/100 mg. tissue) | | | | | |
|---|---|---|---|---|---|---|---|---|---|---|---|---|
| | Inhibitor added | | | Control | | | Inhibitor added | | | Control | | |
| | Medium | Tissue | Total | Medium | Tissue | Total | Medium | Tissue | Total | Medium | Tissue | Total |
| None | 1 | 20 | 21 | 1 | 20 | 21 | 31 | 158 | 189 | 21 | 131 | 152 |
| 2-methyl | 1 | 21 | 22 | 2 | 20 | 22 | 40 | 142 | 186 | 23 | 141 | 164 |
| 3-methyl | 3 | 22 | 25 | 1 | 20 | 21 | 21 | 166 | 187 | 16 | 143 | 159 |
| 4-methyl | 3 | 28 | 31 | 1 | 29 | 30 | 39 | 140 | 179 | 28 | 154 | 182 |
| 2,3-dimethyl | 11 | 20 | 31 | 2 | 24 | 26 | 80 | 151 | 231 | 14 | 124 | 138 |
| 2,4-dimethyl | 5 | 16 | 21 | 1 | 16 | 18 | 39 | 112 | 151 | 13 | 111 | 124 |
| 2,5-dimethyl | 4 | 25 | 30 | 2 | 21 | 23 | 59 | 139 | 197 | 23 | 127 | 150 |
| 2,6-dimethyl | 10 | 20 | 30 | 2 | 25 | 27 | 43 | 143 | 186 | 19 | 151 | 170 |
| 3,5-dimethyl | 5 | 23 | 28 | 2 | 21 | 23 | 59 | 149 | 208 | 23 | 127 | 150 |
| 2,4,6-trimethyl | 24 | 11 | 35 | 1 | 29 | 30 | 229 | 79 | 308 | 28 | 154 | 182 |
| 2,3,5,6-tetramethyl | 38 | 2 | 40 | 2 | 25 | 27 | 238 | 50 | 288 | 19 | 151 | 170 |
| 2,6-diethyl | 22 | 4 | 26 | 2 | 20 | 22 | 286 | 34 | 320 | 23 | 140 | 164 |
| 2,6-diisopropyl | 26 | 1 | 27 | 1 | 20 | 21 | 273 | 13 | 286 | 21 | 131 | 152 |

What is claimed is:

1. A compound selected from the group consisting of bases of the formula

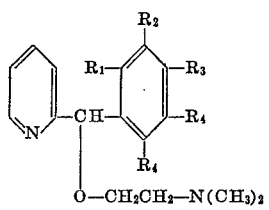

and non-toxic acid-addition salts thereof, wherein $R_1$ is lower alkyl of less than seven carbon atoms, $R_5$ is lower alkyl of less than five carbon atoms and $R_2$, $R_3$ and $R_4$ are each selected from the group consisting of hydrogen and lower alkyl of less than five carbon atoms, and the total number of carbon atoms of $R_1$, $R_2$, $R_3$, $R_4$ and $R_5$ is at least four.

2. 2 - dimethylaminoethyl (2,6-diethylphenyl)-(2-pyridyl)-carbinol.

3. A non-toxic acid-addition salt of the compound of claim 2.

4. 2-dimethylaminoethyl (2,3,5,6-tetramethylphenyl)-(2-pyridyl)-carbinol.

5. A non-toxic acid-addition salt of the compound of claim 4.

6. 2 - dimethylaminoethyl (2,6-diisopropylphenyl)-(2-pyridyl)-carbinol.

7. A non-toxic acid-addition salt of the compound of claim 6.

References Cited

UNITED STATES PATENTS 2,606,193  8/1952  Cusic _____ 260—296
2,606,195  8/1952  Tilford et al. _____ 260—296

JOHN D. RANDOLPH, *Primary Examiner.*

WALTER A. MODANCE, *Examiner.*

A. ROTMAN, *Assistant Examiner.*